(12) United States Patent
Clarke

(10) Patent No.: US 10,972,595 B2
(45) Date of Patent: Apr. 6, 2021

(54) AUDIO HEADSET SYSTEM

(71) Applicant: James Clarke, Newton (GB)

(72) Inventor: James Clarke, Newton (GB)

(73) Assignee: James Clarke, Newton (GB)

( * ) Notice: Subject to any disclaimer, the term of this patent is extended or adjusted under 35 U.S.C. 154(b) by 0 days.

(21) Appl. No.: 16/383,592

(22) Filed: Apr. 13, 2019

(65) Prior Publication Data

US 2019/0327351 A1 Oct. 24, 2019

(30) Foreign Application Priority Data

Apr. 13, 2018 (GB) ..................................... 1806104

(51) Int. Cl.
*H04M 1/04* (2006.01)
*H04M 1/60* (2006.01)

(52) U.S. Cl.
CPC ........... *H04M 1/04* (2013.01); *H04M 1/6033* (2013.01); *H04M 1/6058* (2013.01)

(58) Field of Classification Search
CPC .... H04M 1/6033; H04M 1/6066; H04M 1/05; H04M 1/72502; H04M 1/725; H04M 2250/02; H04M 2250/08; H04W 88/10
See application file for complete search history.

(56) References Cited

U.S. PATENT DOCUMENTS

| | | | |
|---|---|---|---|
| 7,603,139 B1 | 10/2009 | Tom | |
| 2009/0129569 A1 | 5/2009 | Geldbach et al. | |
| 2011/0054907 A1* | 3/2011 | Chipchase | H04M 1/6066 704/275 |
| 2014/0294173 A1* | 10/2014 | Bonde | G06F 1/1632 379/428.02 |
| 2017/0064594 A1* | 3/2017 | Larsen | H04M 1/6066 |
| 2018/0131793 A1* | 5/2018 | Kim | H04M 1/6066 |
| 2019/0124193 A1* | 4/2019 | Kim | H04M 1/6066 |

FOREIGN PATENT DOCUMENTS

| | | |
|---|---|---|
| EP | 3041305 A1 | 7/2016 |
| EP | 3185509 A1 | 6/2017 |

OTHER PUBLICATIONS

United Kingdom Intellectual Property Office, Examination Report, Application No. GB1806104.4, Mar. 21, 2019I 4 pages.
United Kingdom Intellectual Property Office, Combined Search and Examination Report, Application No. GB1806104.4, dated Sep. 21, 2018I 7 pages.

* cited by examiner

*Primary Examiner* — Tuan D Nguyen
(74) *Attorney, Agent, or Firm* — Shami Messinger PLLC

(57) ABSTRACT

A base station for an audio headset system is provided which is able to communicate with a remote device. The base station is configured to be convertible such that it facilitates communication with remote devices over a range of different communication protocols, in accordance with varying user preference.

18 Claims, 4 Drawing Sheets

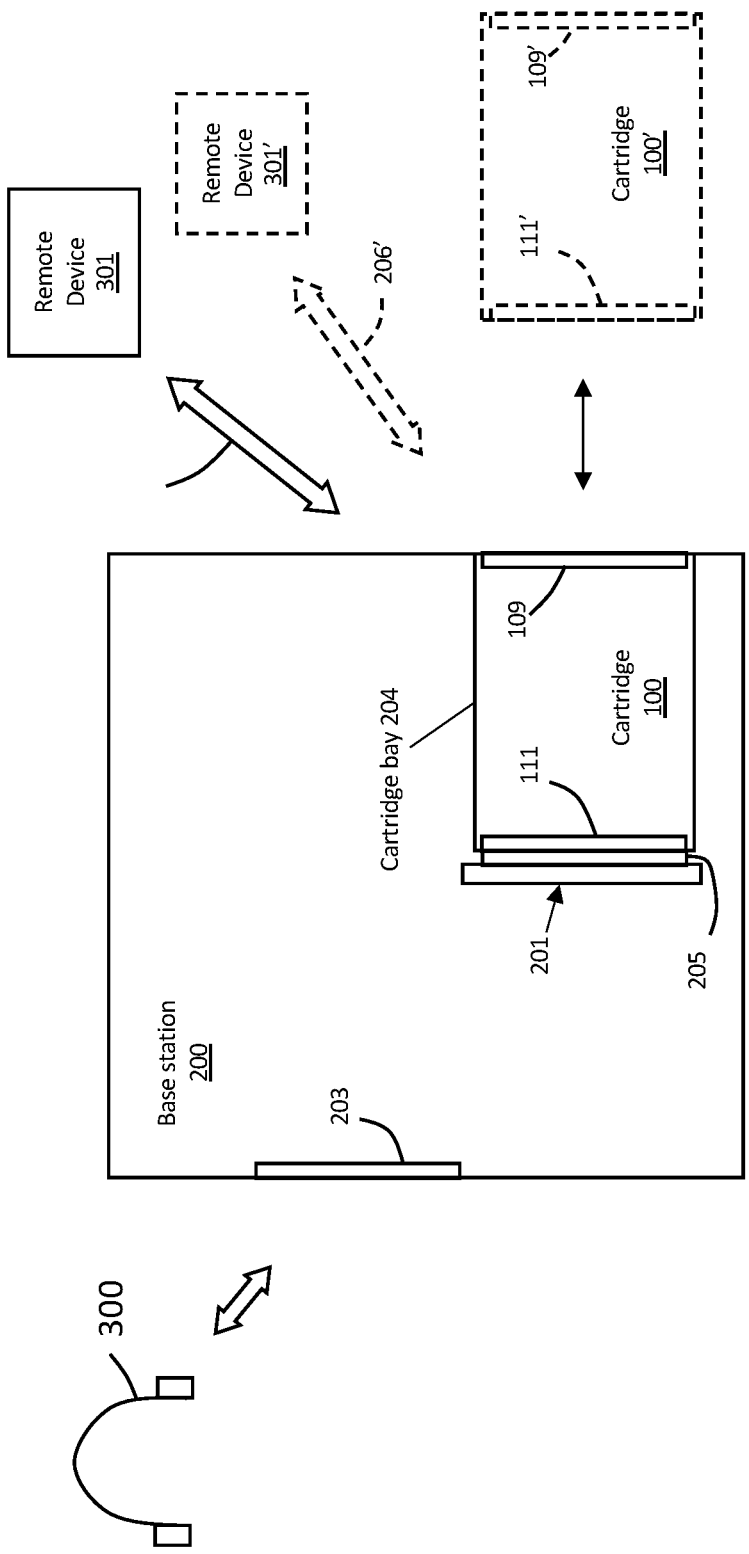

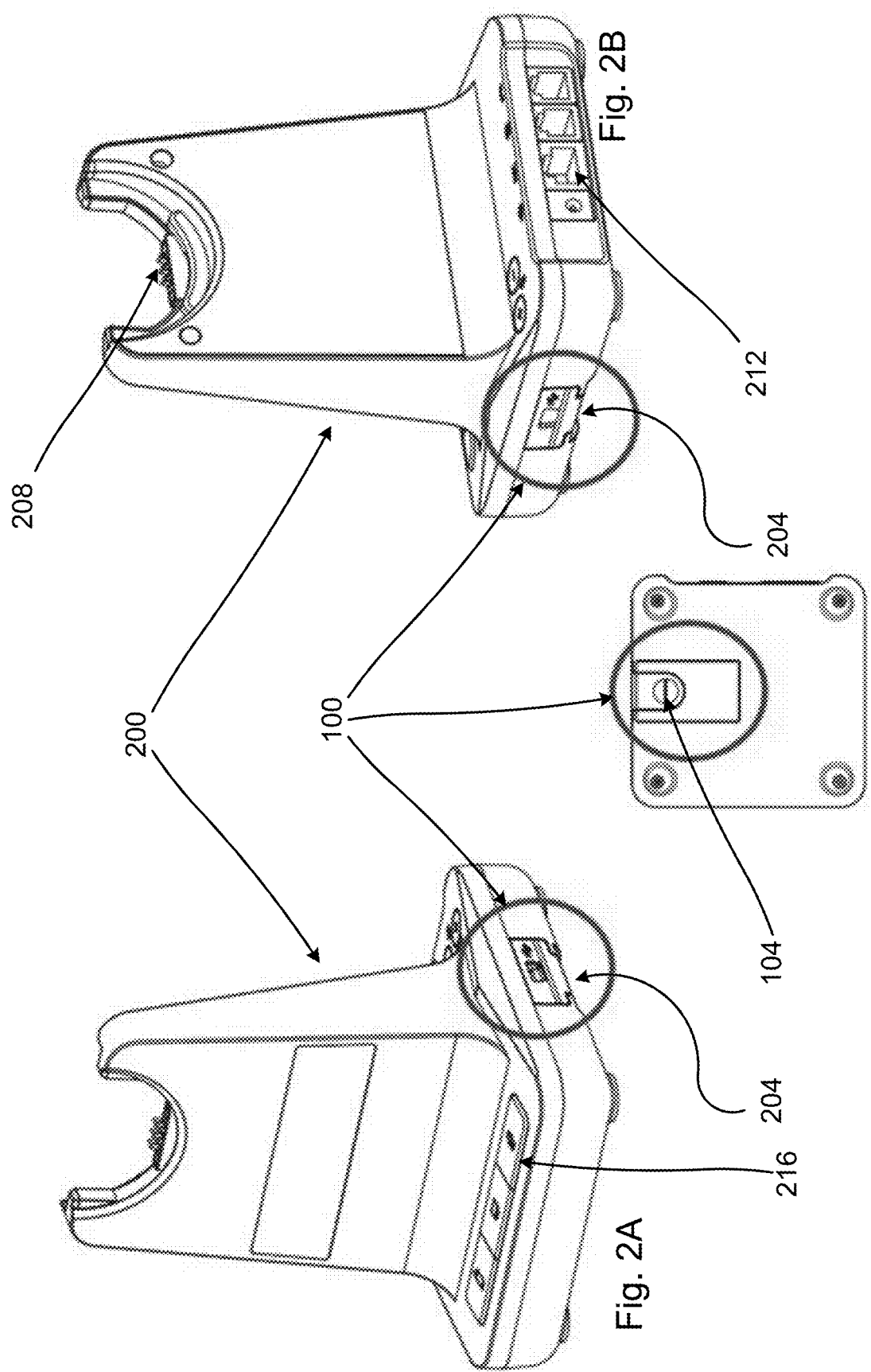

AUDIO HEADSET SYSTEM

FIELD OF THE INVENTION

The present invention relates to headset systems for audio communication, and particularly to base stations for use in such audio headset systems.

BACKGROUND OF THE INVENTION

Telecommunications headsets come in a variety of formats. In particular, it is common in the art for telecommunications headsets to be wireless. To facilitate audio communication the headset must be connected to a telephone system, regardless of whether that connection is to a traditional analogue telephone line or to digital or softphone telephone system, or to a combination of thereof. One way of connecting the wireless headset to a telephone system is by wirelessly connecting the headset to a base station, and by connecting the base station to the telephone system. In such cases there is typically a single communication protocol connecting the headset to the base station, such as Digital Enhanced Cordless Telecommunications (DECT) or Bluetooth™, and then a further communication protocol connecting the base station to a form of telephone system, such as for instance to an analogue telephone for communication over a Public Switched Telephone Network (PSTN).

To support market demands, base stations now exist that provide multiple connections to a plurality of different telephone systems. Hence as well as the analogue telephone line connection, base stations are typically further connected to a computer, for instance by USB protocol, to facilitate digital and softphone calls using Voice Over Internet Protocol (VOIP), and may be connected to a mobile phone, for instance by Bluetooth™ protocol, for communication over mobile cellular network channels.

However, the provision of such a broad range of connectivity entails an increased complexity in the production of the base station. In particular, the base station requires both additional hardware and software to be able to provide the functionality of so many different communication protocols. This results in the base stations that are capable of providing such a broad range of connectivity being expensive for users.

Alternatively, aside from the connection to the headset, base stations exist that are only capable of communication using a single communication protocol, and are therefore connected only to an analog telephone, or connected only to a computer etc. Similarly, aside from the headset, base stations exist that are only capable of communication using two communication protocols, where one connection is to an analogue telephone for communication over PSTN, and the other connection is to either a computer via USB or a mobile phone via Bluetooth™. Both of these options limit the user to having to choose from the outset, at the point of purchase, which channels of communication they will be able to use and which devices they will be able to use to communicate. This limitation will then exist for the lifetime of the base station. To use a different form of communication or to communicate with a different device, the user has to purchase a new base station. This too causes expense to the user, and restricts the choice of functionality available to the user of such a base station.

Further, different users of such base stations will each have different preferred communication protocols over which they prefer to communicate, for instance one user may prefer using VOIP and another user may prefer communication over cellular networks. Indeed, even a single user may change preference over time. The provision of these different base stations, as dictated by varying preferences, is expensive, especially for a large user group such as a call centre.

STATEMENT OF THE INVENTION

It would be beneficial in the field if a headset base station were envisaged in which the most expensive elements of the base station common to all base stations, namely the hardware and software that facilitates analogue telephone communication over PSTN and the hardware and software that facilitates communication with the headset, were modularly separable from other elements. In this way, the expensive elements need only be purchased once, thus allowing a single user to change communication protocol preference at a subsequent time by purchasing the relatively inexpensive other elements, or allowing multiple different users to each have their varying preferences accommodated for in a cost effective manner.

The aspects of the present invention are defined by the accompanying claims.

Preferred embodiments of the invention are now described, by way of example only, with reference to the accompanying drawings.

BRIEF DESCRIPTION OF THE DRAWINGS

There now follows, by way of example only, a detailed description of preferred embodiments of the present invention, with reference to the figures identified below.

FIG. 1A is a schematic diagram showing a base station in operation with cartridges and remote devices in accordance with certain embodiments.

FIG. 2A shows a first perspective view of a base station and cartridge configuration.

FIG. 2B shows a second perspective view of the base station and cartridge configuration of FIG. 2A.

FIG. 2C shows a bottom view of the base station and cartridge configuration of FIG. 2A and FIG. 2B.

DETAILED DESCRIPTION OF THE EMBODIMENTS

Figure 1:
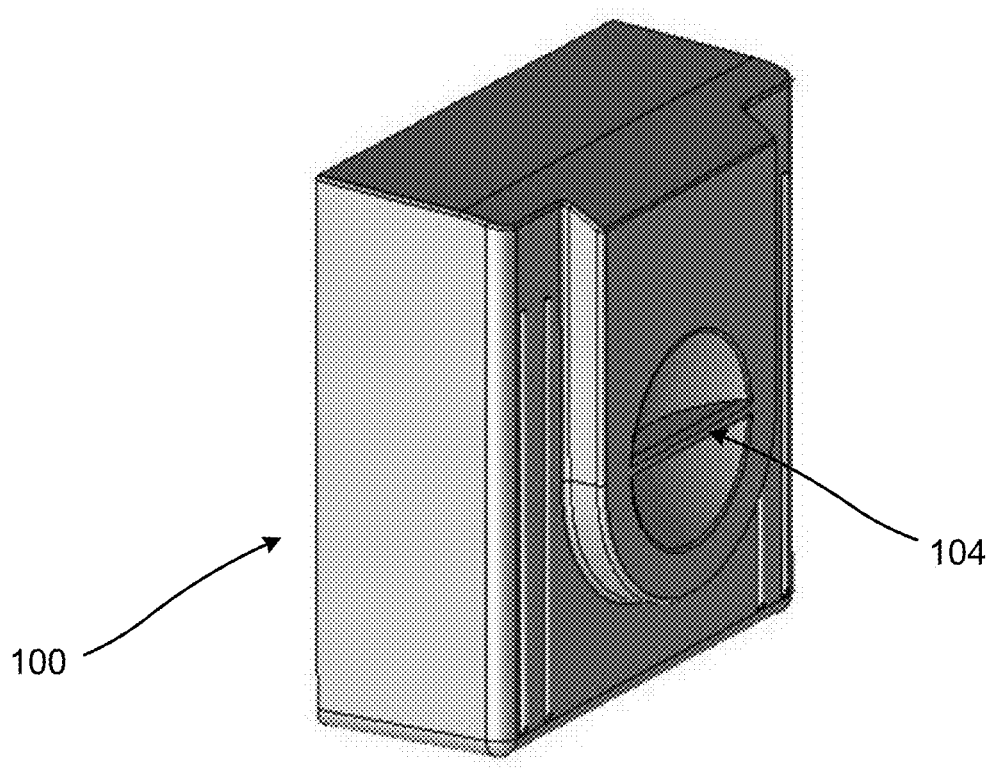
FIG. 1 shows a perspective view of a cartridge.

In the following description, functionally similar parts carry the same reference numerals between figures. Preferred embodiments of the invention are now described, by way of example only, with reference to the accompanying drawings.

Referring to FIG. 1 and FIG. 1A, a cartridge 100 is shown. The cartridge 100 comprises hardware that can facilitate a base station 200 to connect to a second device 301, 301', and that can facilitate communication between the base station 200 and the second device using a particular communication protocol.

The cartridge 100 comprises electrical contacts (not shown in the Figures) for facilitating electrical connection and communication between the cartridge 100 and the base station 200. Each cartridge 100 is configured to transmit and receive data between itself and a second device 301, 301' using a first communication interface 109, and is further configured to transmit and receive data between itself and the base station 200 using the electrical contacts which represent a second communication interface 111. The specific type of communication protocol used by the first communication interface varies between different cartridges 100, and is selected as desired by the user. However, the second communication interface 111 is common to all cartridges 100, 100', etc., thereby making all cartridges compatible for connection with the base station 200. Electrical power is provided to the cartridge 100 from the base station 200 via the second communication interface 111.

The electrical contacts may comprise a physical pin arrangement, or any conventional electrical contacts typical in the field. For instance, if the electrical contacts comprise physical pins, then the physical pin configuration of all cartridges 100 may be the same, regardless of the type of communication protocol they facilitate. Alternatively, the exact physical pin configuration may be specific to all the cartridges 100 configured for communication using a particular communication protocol. In other words, the physical pin configuration of all the cartridges 100 which facilitate communication over a first communication protocol may all be the same, and the physical pin configuration of all the cartridges 100 which facilitate communication over a second communication protocol may all be the same but may be different from the pin configuration of the cartridges 100 which facilitate communication over the first communication protocol. As will be described in more detail below, the base station 200 comprises a connector 201, including a communication interface 205, for receiving the electrical contacts of the cartridge 100 when the cartridge 100 is inserted within the base station 200, thereby facilitating electrical communication between the cartridge 100 and the base station 200 via the communication interface 205.

The cartridge 100 is shaped such that it can securely slide into a mutually shaped orifice of the base station 200 called the cartridge bay 204, and can thereby be securely inserted into and connected to the base station 200 when in use. The cartridge 100 further comprises a handle 104 ergonomically designed to allow a user to securely grip the handle 104 and thereby manipulate the cartridge 100 to be either inserted into or removed from the base station 200. Advantageously, these features allow the cartridges 100 to be simply, conveniently and easily inserted and removed from the base station 200 such that the user may replace a first cartridge 100 with a second cartridge 100, in accordance with varying preferences or different desired applications.

As each cartridge 100 is configured to facilitate communication between the base station 200 and a second device 301, 301' using a particular communication protocol, a number of different specific cartridge 100 embodiments are envisaged. For instance, in an embodiment the second device may be a computer, and the cartridge 100 may comprise hardware that facilitates connection to the computer by USB cable. For instance, the cartridge 100 may comprise a USB socket into which a USB cable can be plugged, and further may internally comprise the necessary electrical circuitry to facilitate US communication between the base station 200 and the computer through the cartridge 100. As described above, such a cartridge 100 may have a particular physical pin configuration specific to cartridges 100 designed for USB communication.

Alternatively, in another embodiment the second device 301, 301' may be a mobile phone, and the cartridge 100 may comprise hardware that facilitates connection to the mobile phone by Bluetooth™. For instance, cartridge 100 may comprise a Bluetooth™ wireless transceiver and the necessary electrical circuitry to facilitate Bluetooth™ communication between the base station 200 and the mobile phone through the cartridge 100. As described above, such a cartridge 100 may have a particular physical pin configuration specific to cartridges 100 designed for Bluetooth™ communication.

Other communication protocols typical in the field of headset communication are known, and cartridges 100 which still fall within the scope of this disclosure can be envisaged which facilitate communication over any such known communication protocol.

Regardless of the specific type of communication protocol facilitated, each cartridge 100 facilitates additional communication functionality between the base station 200 and a second device. This functionality is added to the base station 200 once the cartridge 100 is removably inserted into the base station 200. Hence, the modular cartridge 100 arrangement advantageously allows the user to purchase a single generic base station 200, and thereafter optionally select particular types of additional communication functionality to add to the base station 200 by selecting a particular cartridge 100 or particular cartridges 100. Advantageously, this allows the user to purchase the expensive base station 200 only once, yet to have the full range of functionality available to them at a later date and allowing the user to change preference at a subsequent time by purchasing a relatively inexpensive further cartridge 100 facilitating a different communication type.

Referring to FIGS. 2A, 2B and 2C, the base station 200 is shown from different perspectives, with FIG. 2C showing a bottom view perspective. The base station 200 is shown with a removable cartridge 100 inserted into the cartridge bay 204. The removable cartridge 100 is shown circled for ease of reference, where the circle marking itself forms no part of the disclosed subject matter and is instead merely a visual aid. The cartridge bay 204 is designed to removably receive the cartridge 100, such that a user can advantageously insert and remove cartridges 100 which facilitate different communication protocols in accordance with differing preferences between users, or in accordance with differing preferences of the same user over time or by application. The cartridge 100 and the cartridge bay 204 are mutually shaped such that the cartridge 100 is securely retained within the cartridge bay 204 when inserted. In particular, the interior of the cartridge bay 204 may include retention means such as ridges and/or deformable means such as deformable ridges, and may be complimented by mutual features on the cartridge 100, such that the cartridge 100 is securely retained within the cartridge bay 204 when inserted and yet is easily removable when required using only forces of a magnitude typical of manual human interaction.

The cartridge bay 204 includes electrical contacts (not shown in the Figures) which form a connector 201 for connecting to the electrical contacts of the cartridge 100. The base station 200 further includes electrical circuitry to facilitate communication between the base station 200 and the headset 300 via a wireless communication protocol such as DECT, and to facilitate communication between the base station 200 and an analogue or digital desk phone. Further, the base station 200 includes circuitry, for example in the form of communication interface 205, designed to detect, recognize and communicate with any suitable cartridge 100 that is inserted into the cartridge bay 204.

In particular, when a cartridge 100 is inserted within the cartridge bay 204, the circuitry of the base station 200 includes firmware configured to communicate with the cartridge 100 to detect and determine the type of cartridge 100 which has been inserted, and to configure the base station 200 for operation accordingly. For instance each type of cartridge 100, such as those enabling Bluetooth™ communication or those enabling USB communication, may include electronic data that can be read and processed by the firmware and circuitry of the base station 200 and used to determine the type of communication protocol the cartridge 100 can facilitate. Alternatively, the circuitry may be configured to recognize the type of cartridge 100 by detecting the particular physical pin configuration of the cartridge 100. Further, the base station 200 may be supplied with a 'dummy' cartridge 100 which is non-operational, and which advantageously serves to protect the electrical contacts from damage by exposure to foreign objects.

The base station 200 also includes many features and functionalities that are typical in the field of base station design. The base station 200 may include internal circuitry capable of receiving and processing electrical signals from a variety of different inputs, such as receiving electrical signals encoding audio information received by a microphone of a headset 300, and will be capable of transmitting said electrical signals to a variety of different outputs, for instance to an analogue telephone to which the base station 200 is attached. Further, for instance, the base station may include a charging connector 208 designed to electrically connect to a wireless headset 300 such that the wireless headset 300 may be electrically charged by the base station 200 when connected thereto. In this regard, the base station 200 may be connected by wire to the mains power supply, may be battery operated, and may for instance be charged by induction. The base station 200 may further include ports 212 facilitating wired connection to other devices, such as for instance for facilitating wired connection to an analogue telephone for communication over PSTN. The base station 200 may also have further user selectable buttons 216, to provide additional functionality such as volume control, mute operations, call pick-up, channel selection etc. These will not be described further here.

In operation, once a cartridge 100 of a particular type has been inserted into the cartridge bay 204, the electrical circuitry of the base station 200 detects the type of cartridge 100. Once the type of cartridge 100 is detected, the firmware of the base station 200 configures the base station 200 to be able to communicate using the inserted cartridge 100 and its type of communication protocol. For instance, the firmware of the base station 200 is configured to interwork the newly detected communication interface 111, 111' of the cartridge 100 with the existing communication interfaces it is currently operating. For instance, before insertion of the cartridge 100, the base station 200 will be configured to communicate with the headset 300 via communication interface 203, for instance using DECT, and may additionally be configured to communicate with an analogue telephone via wired a connection for communication over PSTN (not shown). Upon insertion of the cartridge 100, the circuitry of the base station 200 will be configured to add to any such existing functionality to provide the additional communication protocol functionality of the newly inserted cartridge 100. Further, a user selectable button 216 relating to the particular communication protocol of the inserted cartridge 100 may become illuminated and/or become available for selection by a user. Such a button 216 may for instance allow the user to toggle use of that communication protocol over the cartridge 100 interface on and off. In some embodiments, the base station 200 may further comprise a panel onto which a symbol relating to the particular communication protocol may become illuminated, advantageously this allows the user to determine which communication protocol cartridge 100 is loaded into the cartridge bay 204 without disrupting connectivity and functionality, for example by having to remove the cartridge 100 from the cartridge bay 204.

Upon removal of the cartridge 100 by the user, the circuitry of the base station 200 will be configured to automatically detect the absence of the cartridge 100 and will accordingly deprive the base station 200 of the additional functionality that the cartridge 100 provided. At a subsequent time, the user may insert a different cartridge 100' which will accordingly also be detected and provide its particular additional functionality, in the same manner as described above.

Figures 3A, 3B, 3C:
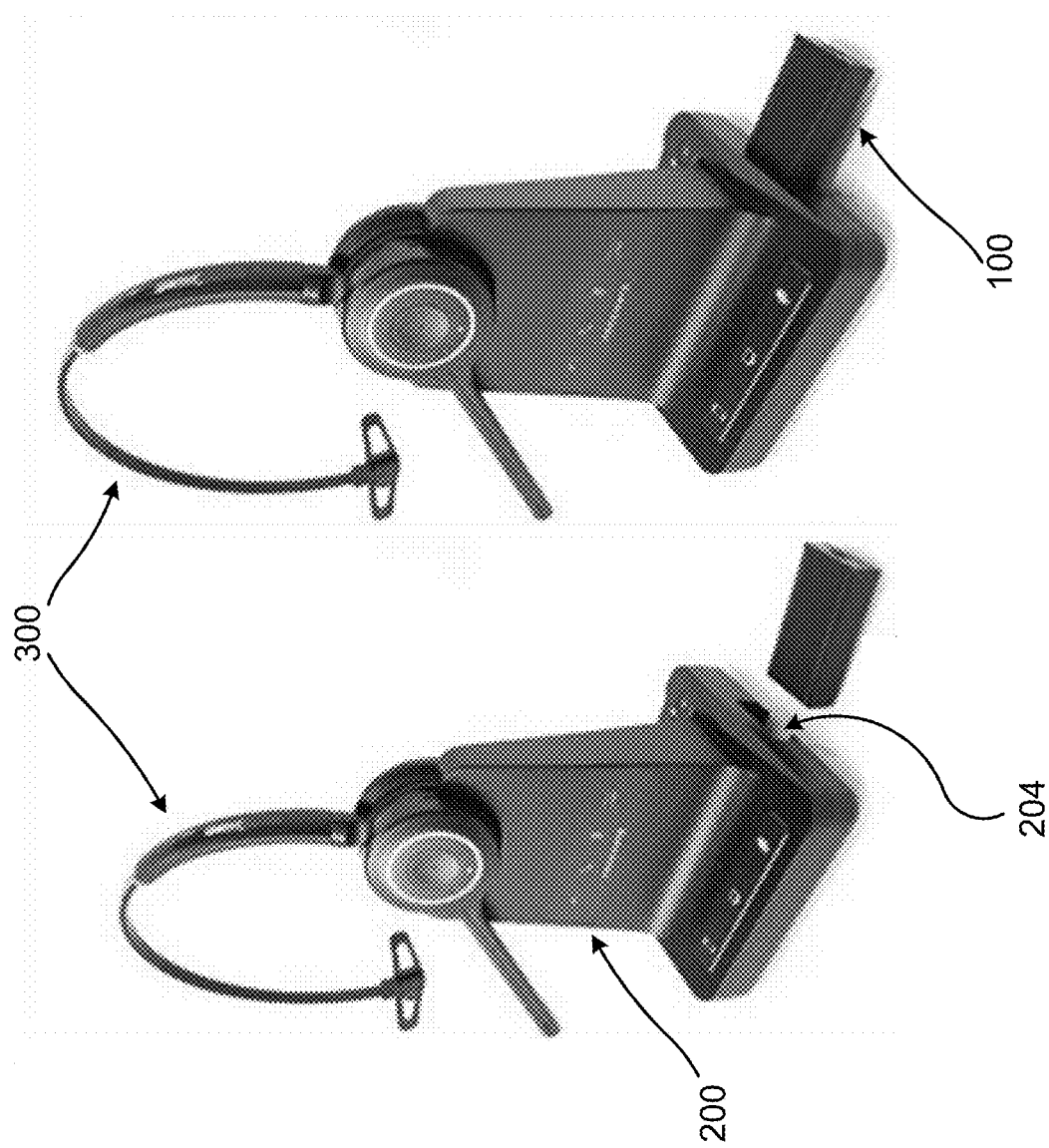
FIG. 3A shows a perspective view of a base station in a first configuration.
FIG. 3B shows a perspective view of the base station of FIG. 3A in a second configuration.
FIG. 3C shows a perspective view of the base station of FIG. 3A and FIG. 3B in a third configuration.

Referring to FIGS. 3A, 3B and 3C, stages of the insertion of a selected cartridge 100 are shown. In FIG. 3A, the cartridge is shown outside of the base station 200. In FIG. 3B, the user has selected a desired cartridge 100 and has partially inserted the cartridge 100 into the cartridge bay 204. In FIG. 3C, the user has fully inserted the cartridge 100 into the cartridge bay 204 where it is securely retained as described above, and the base station 200 is now considered to have been provided with the additional communication functionality of the selected cartridge 100. This is the operational state in which the base station would be used during normal use by the user. In particular, in this state the base station 200 would provide the user with the ability to communicate using a second device, such as a computer or a mobile phone, via the headset 300. In particular, the headset 300 would be able to communicate with the base station 200, for instance by wireless DECT protocol, and the base station 200 would be able to communicate with the second device through the additional communication protocol functionality provided by the inserted cartridge 100. In this way, the user would be provided with the audio communication functionality of the second device, but through the headset 300, via the base station 200.

The headset 300 is a typical headset as is known in the field, and is configured to receive audible sound through a microphone, process this into an electrical signal using internal circuitry, and transmit this electrical signal to the base station 200, for instance using hardware configured to provide wireless DECT protocol communication. The headset 300 is similarly configured to receive electrical signals from the base station 200, for instance by DECT wireless protocol, to process these electrical signal using internal circuitry and to output these signals as audible sound through a speaker to a user. The further operation of the headset 300 is typical in the field and will not be discussed further here.

In operation, the user will select a cartridge 100 which facilitates communication between the base station 200 and a second device using a particular desired communication protocol. The type of cartridge 100 selected will vary depending on user preference or desired present application, for instance which type of second device the user wishes the base station 200 to be able to connect to. For instance, if the user desires to connect the base station 200 to a computer, the user may select a cartridge 100 capable of communication using USB protocol. Alternatively, if the user desires to connect the base station 200 to a mobile phone, the user may select a cartridge 100 capable of communication using Bluetooth™ protocol. The user will proceed to insert the cartridge 100 into the cartridge bay 204 as shown by FIGS. 3A, 3B, and 3C. Once the cartridge 100 is fully inserted and the electrical contacts of the base station 200 are in contact with the mutual electrical contacts on the cartridge 100, the firmware of the base station 200 will configure the base station 200 for use with the newly inserted cartridge 100 such that the base station 200 will be configured to communicate with a second device using the communication protocol of the specific inserted cartridge 100. If the user of the base station 200 changes, or the same user simply desires to be able to communicate with a different second device using a different communication protocol, the user will remove the cartridge 100 by hand as previously described above in relation to FIG. 1 and FIGS. 2A, 2B, and 2C in a manner that will be the reverse of the insertion shown by and described above in relation to FIGS. 3A, 3B, and 3C. The user will then select a different cartridge 100 for insertion, and proceed as previously described.

In this manner, the user is advantageously provided with a base station 200 in which the most expensive elements of the base station 200 are modularly separable from other elements. In this way, the expensive elements need only be purchased once, thus allowing a single user to change communication protocol preference at a subsequent time by purchasing relatively inexpensive further cartridges 100 facilitating different communication protocols, or allowing multiple different users to each have their varying preferences accommodated for in a cost effective manner.

ALTERNATIVE EMBODIMENTS

The embodiment described above is illustrative of, rather than limiting to, the present invention. Alternative embodiments apparent on reading the above description may nevertheless fall within the scope of the invention.

The invention claimed is:

1. An audio communication system base station, comprising:
   a first communication interface operable to communicate with a headset; and
   a physical cartridge connection means for connection to one of a plurality of different types of cartridges, wherein said plurality of different types of cartridges are manually and removably connectable thereto and each different type of cartridge has an associated one of a plurality of different communication protocols, and
   wherein the physical cartridge connection means comprises a second communication interface;
   means for detecting the communication protocol of a connected cartridge from the plurality of different communication protocols; and
   means for configuring the base station for use with the detected communication protocol;
   wherein the base station is configured such that in use when a cartridge is connected, duplex communication data can be transmitted between the connected cartridge and the base station via the second communication interface,
   between the base station and a remote device via the connected cartridge using the detected communication protocol, and between the base station and the headset via the first communication interface, such that duplex communication data can be transmitted between the remote device and the headset via the base station.

2. The base station of claim 1, wherein the physical cartridge connection means comprises a cartridge bay into which one of a plurality of cartridges can be manually and removably inserted.

3. The base station of claim 1, wherein the first communication interface is operable to communicate with the headset using Digital Enhanced Cordless Telecommunications (DECT) protocol.

4. The base station of claim 1, further comprising an additional communication interface operable to transmit and receive duplex communication data with a telephone using a Public Switched Telephone Network (PSTN).

5. The base station of claim 1, further comprising a charging dock for providing electrical power to the headset.

6. A kit of parts comprising:
   the base station according claim 1; and
   a first cartridge for manual and removable connection to the physical cartridge connection means and having an associated one of the plurality of different communication protocols, the first cartridge comprising:
      a third communication interface operable to, when the first cartridge is connected to the physical cartridge connection means, transmit and receive duplex communication data with the base station via the second communication interface; and
      a fourth communication interface operable to, when the first cartridge is connected to the physical cartridge connection means, transmit and receive duplex communication data with the remote device using the communication protocol associated with the first cartridge.

7. The kit of parts of claim 6, wherein the communication protocol is USB protocol.

8. The kit of parts of claim 6, wherein the communication protocol is Bluetooth™ protocol.

9. The kit of parts of claim 6, wherein the remote device is a computer.

10. The kit of parts of claim 6, wherein the remote device is a mobile device.

11. The kit of parts of claim 10, wherein the mobile device is a mobile telephone.

12. The kit of parts of claim 6, further comprising a second cartridge for manual and removable connection to the physical cartridge connection means and having a second communication protocol different from the first cartridge, the second cartridge comprising:
   a fifth communication interface operable to, when the second cartridge is connected to the physical cartridge connection means, transmit and receive duplex communication data with the base station via the second communication interface;
   a sixth communication interface different from the fourth communication interface, wherein the sixth communication interface is operable to, when the second cartridge is connected to the physical cartridge connection means, transmit and receive duplex communication data with a remote device using the second communication protocol.

13. The kit of parts of claim 12, wherein if the communication protocol is USB protocol, then the second communication protocol is Bluetooth™ protocol.

14. The kit of parts of claim 6, further comprising a headset.

15. A method comprising:
   providing the kit of parts having:
      an audio communication system base station including:

a first communication interface operable to communicate with a headset;

a physical cartridge connection means for connection to one of a plurality of different types of cartridges, wherein said plurality of different types of cartridges are manually and removably connectable thereto and each different type of cartridge has an associated one of a plurality of different communication protocols, and wherein the physical cartridge connection means comprises a second communication interface;

means for detecting the communication protocol of a connected cartridge from the plurality of different communication protocols; and means for configuring the base station for use with the detected communication protocol, wherein the base station is configured such that in use when a cartridge is connected, duplex communication data can be transmitted between the connected cartridge and the base station via the second communication interface, between the base station and a remote device via the connected cartridge using the detected communication protocol, and between the base station and the headset via the first communication interface, such that duplex communication data can be transmitted between the remote device and the headset via the base station; and a first cartridge for manual and removable connection to the physical cartridge connection means and having an associated one of the plurality of different communication protocols, the first cartridge comprising:

a third communication interface operable to, when the first cartridge is connected to the physical cartridge connection means, transmit and receive duplex communication data with the base station via the second communication interface; and a fourth communication interface operable to, when the first cartridge is connected to the physical cartridge connection means, transmit and receive duplex communication data with the remote device using the communication protocol associated with the first cartridge; and manually connecting the first cartridge to the physical cartridge connection means of the base station.

16. The method of claim 15, further comprising:

detecting the communication protocol represented by the communication protocol associated with the connected first cartridge; and configuring the base station in accordance with the detected protocol for use with the detected protocol.

17. The method of claim 15, further comprising:

providing a second cartridge for manual and removable connection to the physical cartridge connection means, the second cartridge comprising:

a fifth communication interface operable to, when the second cartridge is connected to the physical cartridge connection means, transmit and receive duplex communication data with the base station via the second communication interface;

a sixth communication interface different from the fourth communication interface, wherein the sixth communication interface is operable to, when the second cartridge is connected to the physical cartridge connection means, transmit and receive duplex communication data with a remote device using a second communication protocol;

manually removing the first cartridge;

manually connecting the second cartridge to the physical cartridge connection means of the base station.

18. The method of claim 17, further comprising:

detecting the communication protocol represented by the communication protocol of the connected second cartridge; and configuring the base station in accordance with the detected protocol for use with the detected protocol.

* * * * *